United States Patent
Dobbin

(10) Patent No.: US 10,415,623 B2
(45) Date of Patent: *Sep. 17, 2019

(54) CAP WITH INJECTED SEALANT

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 598 days.

This patent is subject to a terminal disclaimer.

(21) Appl. No.: 14/913,072

(22) PCT Filed: Jul. 21, 2014

(86) PCT No.: PCT/GB2014/052216
§ 371 (c)(1),
(2) Date: Feb. 19, 2016

(87) PCT Pub. No.: WO2015/025130
PCT Pub. Date: Feb. 26, 2015

(65) Prior Publication Data
US 2016/0195125 A1 Jul. 7, 2016

(30) Foreign Application Priority Data

Aug. 21, 2013 (GB) .................................. 1314994.3
Dec. 2, 2013 (GB) .................................. 1321248.5

(51) Int. Cl.
*A47G 3/00* (2006.01)
*F16B 37/14* (2006.01)
(Continued)

(52) U.S. Cl.
CPC .............. *F16B 37/14* (2013.01); *B64D 45/02* (2013.01); *F16B 33/004* (2013.01)

(58) Field of Classification Search
USPC .................................................. 411/377, 431
See application file for complete search history.

(56) References Cited

U.S. PATENT DOCUMENTS 4,400,123 A * 8/1983 Dunegan ................. F16B 37/14
116/270
4,905,931 A 3/1990 Covey
(Continued)

FOREIGN PATENT DOCUMENTS

CN 1764798 A 4/2006
DE 2509225 A1 9/1976
(Continued)

OTHER PUBLICATIONS

International Search Report and Written Opinion in Application No. PCT/GB2014/052216 dated Oct. 17, 2014.
(Continued)

*Primary Examiner* — Gary W Estremsky
(74) *Attorney, Agent, or Firm* — Nixon & Vanderhye P.C.

(57) ABSTRACT

A cap for forming a sealed cavity around an end of a fastener protruding from a structure. The cap has: a cap body with an annular base terminating at a rim which surrounds an opening into a central cavity; an annular skirt providing an annular pocket between the skirt and the base; and an inlet hole in the skirt. The inlet hole is in fluid communication with the pocket and arranged to interconnect with a sealing material injection device to provide a flow of sealing material through the skirt via the inlet hole into the pocket. An outlet is also provided in the skirt. The outlet is in fluid communication with the pocket and arranged to enable air to escape the pocket through the skirt via the outlet hole as the sealing material flows from the inlet hole into the pocket.

22 Claims, 8 Drawing Sheets

(51) Int. Cl.
*B64D 45/02* (2006.01)
*F16B 33/00* (2006.01)

(56) References Cited

U.S. PATENT DOCUMENTS

| | | | | |
|---|---|---|---|---|
| 6,135,691 | A * | 10/2000 | Nadarajah | F16B 37/14 |
| | | | | 411/372.6 |
| 8,616,868 | B2 * | 12/2013 | Hutter, III | B29C 33/00 |
| | | | | 156/578 |
| 9,400,007 | B2 * | 7/2016 | Dobbin | F16B 39/021 |
| 9,829,030 | B2 * | 11/2017 | Dobbin | B64D 45/02 |
| 9,951,804 | B2 * | 4/2018 | Dobbin | F16B 37/14 |
| 2004/0195538 | A1 | 10/2004 | Raines et al. | |
| 2013/0322982 | A1 | 12/2013 | Dobbin | |
| 2014/0048198 | A1 | 2/2014 | Dobbin | |
| 2014/0234050 | A1 | 8/2014 | Asahara et al. | |
| 2015/0184688 | A1 | 7/2015 | Dobbin et al. | |
| 2016/0138641 | A1 * | 5/2016 | Dobbin | B64D 45/02 |
| | | | | 411/377 |
| 2016/0159493 | A1 | 6/2016 | Dobbin et al. | |
| 2016/0195125 | A1 | 7/2016 | Dobbin | |
| 2016/0230801 | A1 * | 8/2016 | Dobbin | F16B 37/14 |
| 2016/0244181 | A1 * | 8/2016 | Dobbin | B64D 45/02 |
| 2016/0245330 | A1 * | 8/2016 | Dobbin | F16B 37/14 |

FOREIGN PATENT DOCUMENTS

| | | |
|---|---|---|
| EP | 0334011 A1 | 9/1989 |
| EP | 2698318 A2 | 2/2014 |
| FR | 2626629 A1 | 8/1989 |
| GB | 2163817 A | 3/1986 |
| GB | 2226801 A | 7/1990 |
| JP | H02138488 A | 5/1990 |
| JP | 2001-165138 | 6/2001 |
| JP | 2013-119335 | 6/2013 |
| WO | 2004089436 A2 | 10/2004 |
| WO | 2012107741 A1 | 8/2012 |
| WO | 2013065311 A1 | 5/2013 |
| WO | 2013178985 A1 | 12/2013 |
| WO | 2015015153 A1 | 2/2015 |
| WO | 2015025130 A1 | 2/2015 |

OTHER PUBLICATIONS

Search Report in Great Britain Application No. 1314994.3 dated Jan. 7, 2014.

Search Report in Great Britain Application No. 1321248.5 dated Mar. 28, 2014.

Notice of Reasons for Rejection for Japanese Application No. 2016-535522, eight pages, dated May 29, 2018 (including translation).

European Search Report dated Jul. 1, 2016 EP Application No. 16155776.

China Search Report dated Jan. 22, 2017 CN Application No. 201480045843-1.

Text of the First Office Action, CN Application No. 201480045843-1.

* cited by examiner

CAP WITH INJECTED SEALANT

RELATED APPLICATIONS

The present application is a National Phase of International Application Number PCT/GB2014/052216, filed Jul. 21, 2014, and claims priority to Great Britain Application Numbers GB 1314994.3, filed Aug. 21, 2013, and GB 1321248.5, filed Dec. 2, 2013.

FIELD OF THE INVENTION

The present invention relates to a cap for forming a sealed cavity around an end of a fastener protruding from a structure. It also relates to a joint with such a cap, and a method of forming such a joint.

BACKGROUND OF THE INVENTION

A known cap for forming a sealed cavity around an end of a fastener protruding from a structure is described in WO-A-2012/107741. The cap has a two part construction with an inner cap and an outer cap. Sealing material is provided between the caps, and the outer cap is pushed down to force the sealing material into an annular pocket and form a seal with the structure.

SUMMARY OF THE INVENTION

A first aspect of the invention provides a cap for forming a sealed cavity around an end of a fastener protruding from a structure. The cap comprises: a cap body with an annular base terminating at a rim which surrounds an opening into a central cavity; an annular skirt providing an annular pocket between the skirt and the base; an inlet hole in the skirt, wherein the inlet hole is in fluid communication with the pocket and arranged to interconnect with a sealing material injection device to provide a flow of sealing material through the skirt via the inlet hole into the pocket; and an outlet in the skirt, wherein the outlet is in fluid communication with the pocket and arranged to enable air to escape the pocket through the skirt via the outlet as the sealing material flows from the inlet hole into the pocket.

A second aspect of the invention provides a joint comprising: a structure; an end of a fastener protruding from the structure; and a cap according to the first aspect forming a sealed cavity around the end of a fastener, the cap comprising a cured sealing material in the pocket which secures the cap to the structure.

A third aspect of the invention provides a method of assembling such a joint, the method comprising: fitting the cap over the end of the fastener, interconnecting the inlet hole with a sealing material injection device; and providing a flow of sealing material from the sealing material injection device through the skirt via the inlet hole into the pocket, air escaping the pocket through the skirt via the outlet as it does so.

The cap body and the skirt may be formed by separate parts as in WO-A-2012/107741, but more preferably at least part of the skirt is integrally formed with the annular base (for instance by injection moulding).

The outlet may comprise any opening or passage which enables air to escape the pocket through the skirt via the outlet as the sealing material flows from the inlet hole into the pocket. In one embodiment the outlet is an outlet hole in the skirt—typically a closed hole with a portion of skirt between the outlet hole and the skirt rim. In another embodiment the outlet comprises a recess in a rim of the skirt. Typically the skirt terminates in a skirt rim which surrounds the pocket and lies in a plane except where it is formed with the recess.

The annular pocket between the skirt and the base may have a depth which reduces towards the outlet, either continuously or in a series of steps. Typically the skirt extends from an outboard end where it meets the cap body to a skirt rim, and the depth of the skirt from its outboard end to the skirt rim reduces towards the outlet.

The annular skirt typically surrounds a cap axis. The inlet hole and the outlet may be positioned side-by-side on the same side of the cap axis, but more preferably they are positioned on opposite sides of the cap axis.

The inlet hole may be just a hole in the skirt which is suitable sized to receive a nozzle of the injection device. However more preferably the skirt comprises a tubular projection which projects outwardly from the skirt and provides an injection channel leading to the inlet hole, and the tubular projection is arranged to interconnect with the sealing material injection device.

The inlet hole, injection channel and tubular projection may be of any shape, but typically they are circular in cross-section.

The rim of the annular base typically lies in a plane around all or a majority of its circumference. This enables the rim of the annular base to contact a planar surface of the structure around all or a majority of its full circumference. The skirt terminates at a skirt rim which may be set back from the rim of the annular base, but more typically it lies in the same plane as the rim of the annular base.

Typically the outboard end of the skirt lies in a first plane and the skirt rim lies in a second plane. Preferably a centre of the outlet is positioned closer to the first plane than to the second plane.

In one embodiment the skirt has a first part which is integrally formed with the annular base from a first material and terminates at a first rim which is not in the same plane as the rim of the annular base, and a second part which is formed from a second material which is more flexible than the first material, wherein the second part terminates at the skirt rim which is in the same plane as the rim of the annular base. The second part may be bonded or otherwise secured to the first part (for instance by two-part moulding) or it may be fitted over the first part to form a nested arrangement.

The cap body typically contacts the end of the fastener. Optionally the cap body has one or more projections, the (or each) projection extending inwardly into the central cavity and gripping the end of the fastener. In a preferred embodiment the projections comprise three or more axially extending ribs.

The skirt extends from an outboard end where it meets the cap body, to a skirt rim. Similarly the pocket extends from an outboard end proximate the outboard end of the skirt, to an inboard end proximate the skirt rim. The pocket may have a uniform width, or it may have a width which increases as it extends from its outboard end to its inboard end.

The skirt may have two or more outlets, but this is less preferred than only a single outlet. Providing only a single outlet ensures that the pocket fills with sealing material (without air gaps) before sealing material is forced out of the outlet.

The cured sealing material typically fills the outlet and optionally also protrudes out of the outlet. The detection of a flow of sealing material out of the pocket through the outlet may be used as a trigger to stop the flow of sealing material.

Typically the joint is installed on an aircraft, most preferably where the structure forms part of an aircraft fuel tank.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
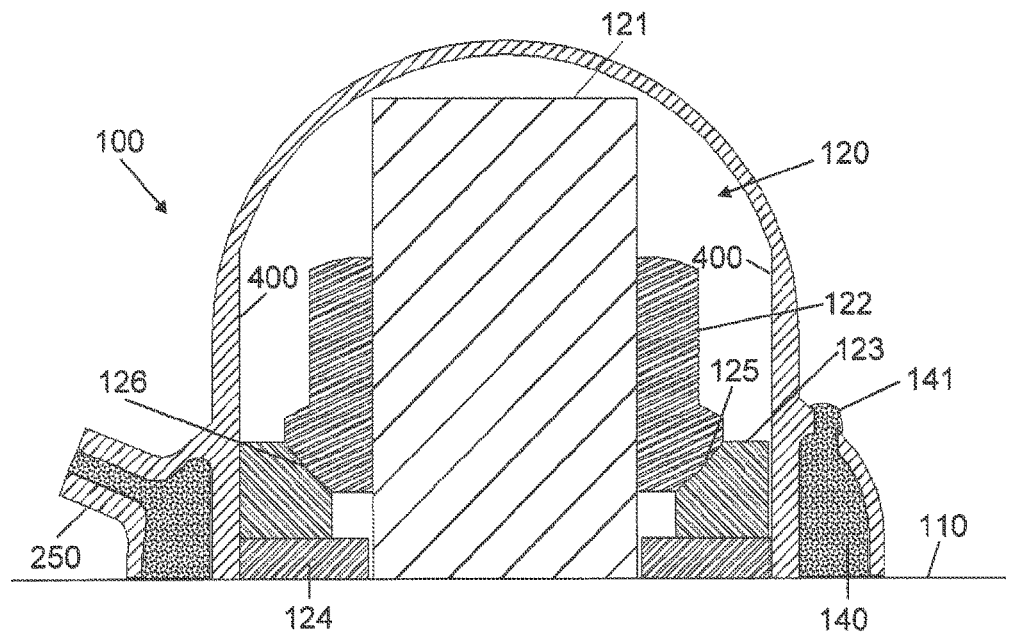
FIG. 1 is a cross-section of a joint taken along a line A-A in FIG. 4.

A joint 100 shown in FIG. 1 comprises a structure 110 such as an aircraft skin panel. An end 120 of a fastener protrudes from the structure. The fastener comprises an axially extending shaft 121 which passes through the structure 110, a nut 122 screwed onto the shaft 121, and a pair of washers 123, 124 between the nut 122 and the structure 110. The washer 123 has a spherical concave surface 125 which bears against a similarly shaped convex surface 126 of the nut 122, thus enabling the shaft 121 to extend at an acute angle to the surface 110 (rather than at a right-angle as in FIG. 1).

Figure 2:
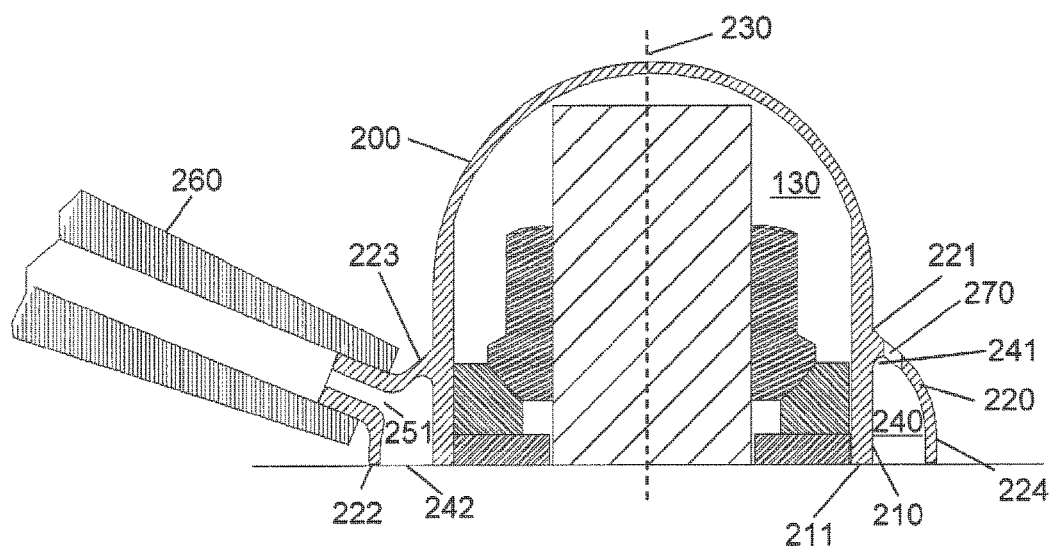
FIG. 2 is a cross-section taken along the line A-A in FIG. 4 before the sealing material has been injected, showing an injection nozzle fitted to the cap.
Figure 3:
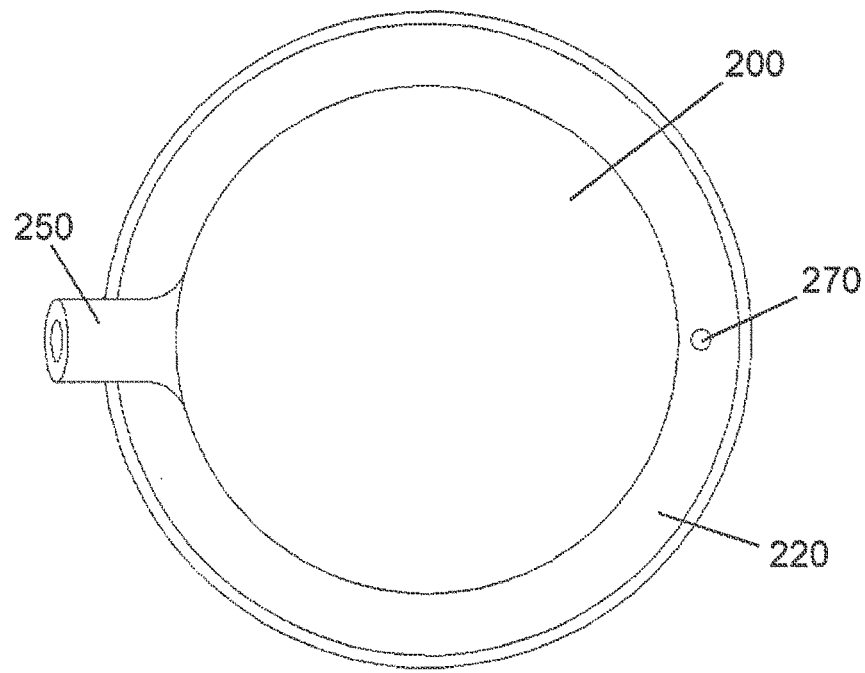
FIG. 3 is a plan view of the cap.

A cap encloses the end 120 of the fastener and will be described in detail with reference to FIG. 2. The cap has a cap body with a domed outboard (upper) part 200 and a cylindrical base 210 terminating at a rim 211 which surrounds an opening into a central cavity 130. The rim 211 lies in a plane so it can intimately engage with the planar surface of the structure 110 around its full circumference when the cap is fitted over the end 120 of the fastener as shown.

Figure 4:
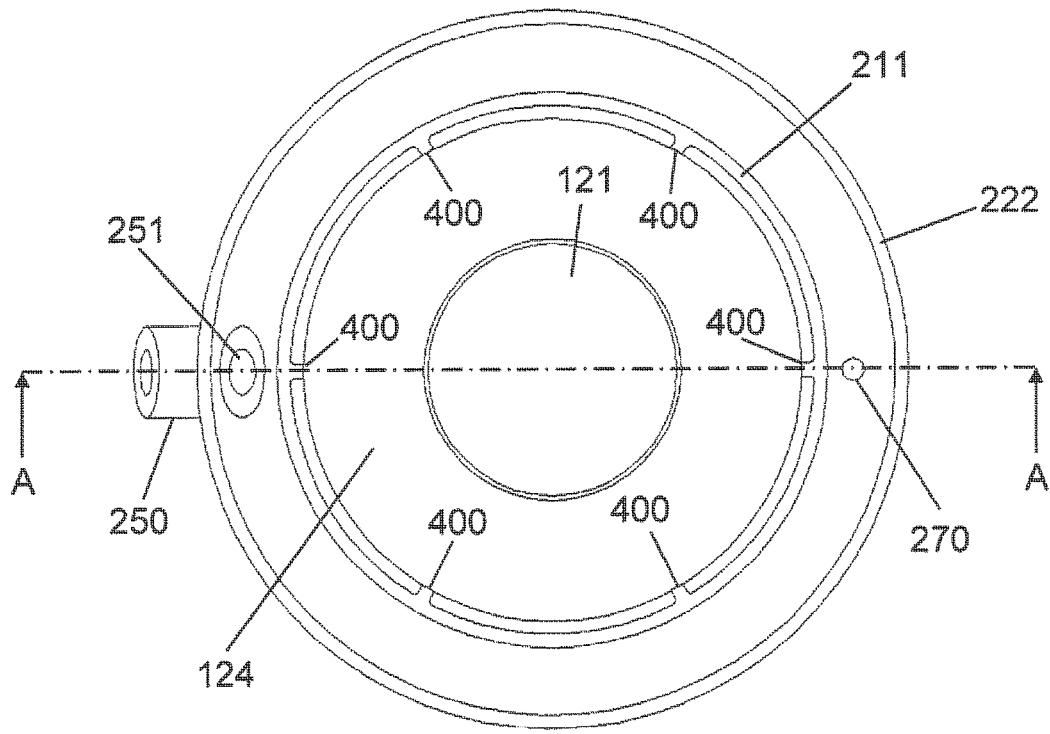
FIG. 4 is an underside view of the cap.

The cap body is formed with six axially extending ribs 400 which project inwardly into the central cavity as shown most clearly in FIG. 4. The ribs 400 grip the cylindrical outer faces of the washers 123,124 as an interference fit, securing the cap in place.

An annular skirt 220 extends from an outboard (upper) end 221 where it meets the cap body to an inboard (lower) skirt rim 222 which lies in the same plane as the rim 211 of the annular base. Like the rim 211, the skirt rim 222 also contacts the planar surface of the structure 110 around the full closed circumference of the skirt rim 222. The skirt has a flared outboard (upper) part 223 which extends away from the body at an acute angle to a cap axis 230, and a cylindrical inboard (lower) part 224 which extends parallel with the cap axis 230.

An annular pocket 240 is provided between the skirt 220 and the base 210. The pocket 240 extends from a closed outboard end 241 at the outboard end 221 of the skirt, to an open inboard end 242 at the skirt rim 222. Due to the flared shape of the outboard part 223 of the skirt, the pocket 240 has a radial width which increases as it extends from its outboard end 241 to its inboard end 242.

The skirt has a tubular projection 250 which projects outwardly from the skirt and provides an injection channel leading to a circular inlet hole 251. The tubular projection 250 is arranged to interconnect with a nozzle 260 of a sealing material injection device to provide a flow of sealing material through the skirt via the inlet hole 251 into the pocket 240. In this case they are interconnected by receiving the projection 250 within the nozzle 260, although the opposite arrangement is also possible.

A suitable sealant material is a polysulphide sealant such as Naftoseal® MC238B, MC238A, or MC780 available from Chemetall Group.

The skirt also has a circular outlet hole 270 on an opposite side of the cap axis 230 to the inlet hole 251. The outlet hole 270 is in fluid communication with the pocket 240 and is arranged to enable air to escape the pocket 240 through the skirt via the outlet hole 270 as the sealing material flows from the inlet hole 251 into the pocket. When the pocket is full, then the pressure in the pocket increases until it forces sealing material to escape the pocket through the skirt via the outlet hole 270. When this flow of sealing material out of the outlet hole 270 is visually observed, the flow of sealing material from the sealing material injection device 260 is stopped and the device 260 is removed.

The sealing material is then allowed to cure, leaving a cured sealing material 140 (shown in FIG. 1) in the pocket which secures the cap to the structure and forms a seal around the cavity 130. This seal prevents the ingress of water or other contaminants into the cavity 230, and also prevents plasma or other out-gassing products from exiting the cavity 230 in the event of a lightning strike. The cured sealing material has a small stub 141 protruding from the outlet hole 270. Cured sealing material also fills the injection channel and the inlet hole 251.

The outlet hole 270 has an axial position which is closer to an axial position of the closed outboard end 241 of the pocket than it is to an axial position of the inboard end 242 of the pocket. In other words, a centre of the outlet hole 270 is positioned closer to the plane of the outboard end 241 of the pocket than to the plane of the rims 211, 222. Positioning the outlet hole 270 towards the outboard (top) end of the pocket 240 in this way is preferred since it ensures that the pocket is completely full (without air gaps) before the sealing material starts to flow out. Also, providing only a single outlet hole 270 in the skirt (rather than multiple outlet holes) ensures that the sealing material only starts flowing out when the pocket is completely full.

All parts of the cap are integrally formed by injection moulding or similar. A suitable material is a glass filled polyetherimide (PEI) resin such as Ultem 2400 or Ultem 2310, available from SABIC Innovative Plastics Holding BV.

Figure 5:
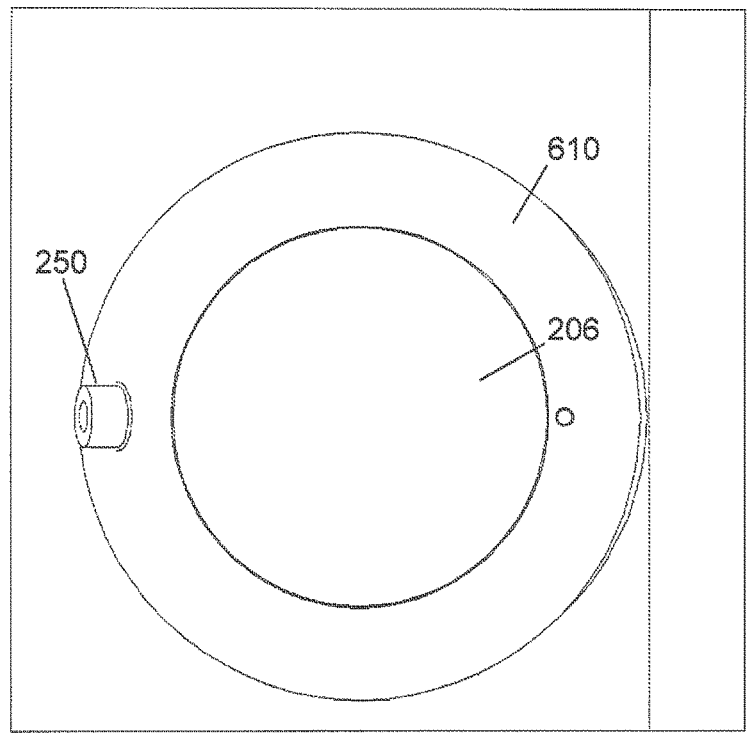
FIG. 5 is a plan view of a two-part cap installed in a panel.
Figure 6:
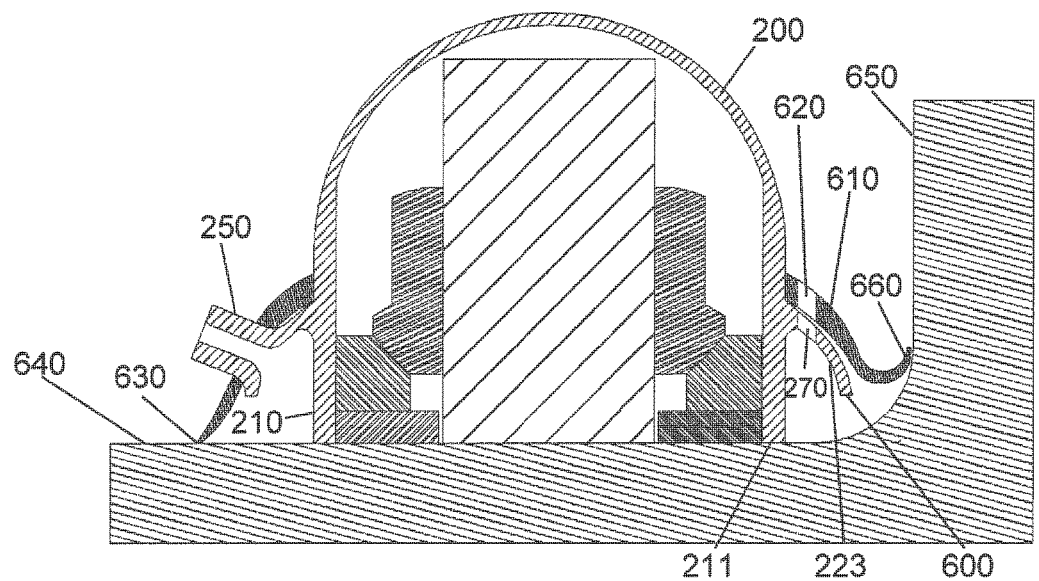
FIG. 6 is a cross-section of the two-part cap installed on the panel.
Figure 7:
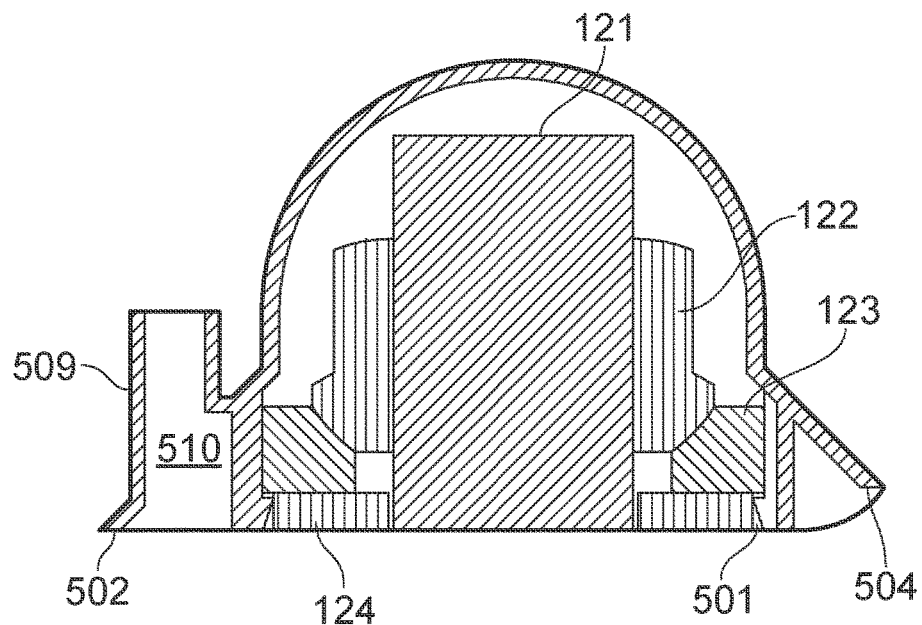
FIG. 7 is a cross-section of a cap installed on a fastener.

An alternative cap is shown in FIGS. 5 and 6. The flared part 223 of the skirt is integrally formed with the annular base 210 from a first material (such as Ultem 2400 or Ultem 2310) and terminates at a first rim 600 which is set back axially so it is not in the same plane as the rim 211 of the annular base 210. A second part 610 of the skirt is fitted over the flared part 223 to form a nested arrangement. The second part 610 has a hole through which the projection 250 protrudes, and an outlet hole 620 which is aligned with the other outlet hole 270.

The second part 610 is formed from a second material which is more flexible than the material forming the flared part 223, and terminates at a skirt rim 630 which is in the same plane as the rim 211 of the annular base. The structure has a planar part 640 and a raised part 650. The flexible second part 630 of the skirt can flex to form a raised lip 660 where it engages this raised part 650 of the structure. A suitable material for the second part 610 is a chemically resistant elastomer qualified for fuel tank and adherable to sealant, for example Viton® fluoroelastomer available from Du Pont. Alternatively it could be made from cured sealant using a two stage moulding process.

A further embodiment of the invention is shown in FIGS. 7-13. The cap body is formed with four axially extending ribs 500 which project inwardly into the central cavity as shown most clearly in FIG. 11. Each rib 500 has a hook 501 at its lower (inboard) end. The washer 124 has a slightly smaller outer diameter than the washer 123 so that a shallow annular recess is formed. The hooks 501 are received as a snap-fit in the recess, the overhanging part of the washer 123 engaging the hooks 501 and preventing the cap from being removed.

Figure 14:
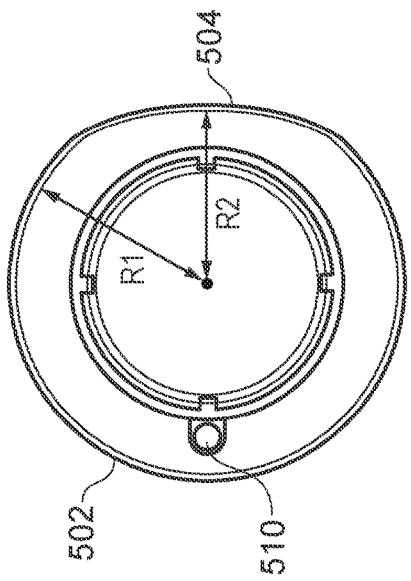
FIG. 14 is an underside view of the cap of FIG. 8.
Figure 11:
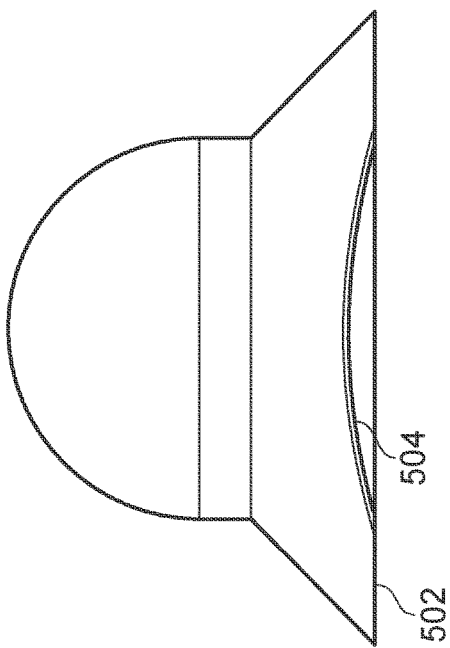
FIG. 11 is a front view of the cap of FIG. 8.
Figure 13:
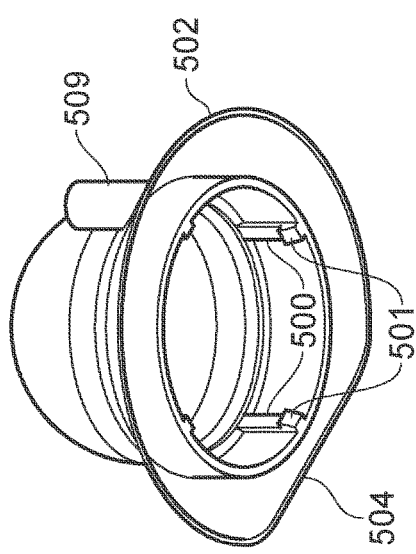
FIG. 13 is an isometric view of the cap of FIG. 8.

The skirt terminates in a skirt rim 502 which surrounds the pocket and lies in a plane around a majority of its circumference except where it is formed with an outlet recess 504 shown most clearly in FIG. 11. As shown in FIG. 14, the outlet recess 504 extends around about ⅛th of the circumference of the cap. The skirt is formed opposite the recess with a cylindrical boss 509 leading to an inlet hole 510. The boss 509 extends axially away from the inlet hole 510, unlike the boss 250 in the first embodiment which is inclined relative to the cap axis.

Figure 8:
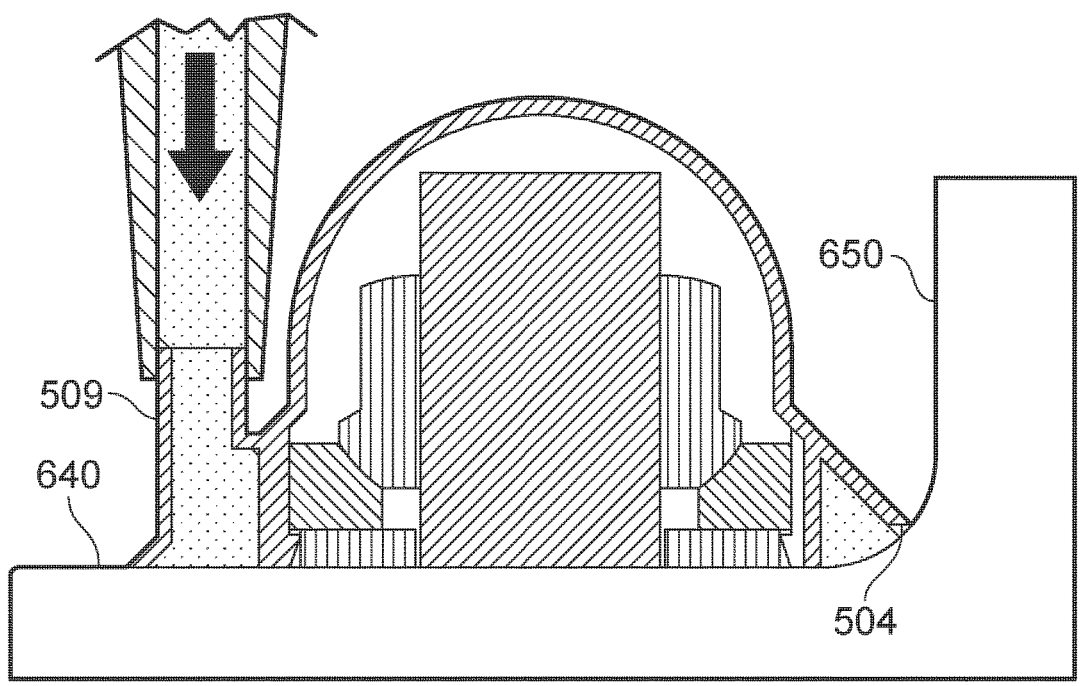
FIG. 8 shows the cap of FIG. 8 being injected with sealant on a panel with a raised fillet.
Figure 9:
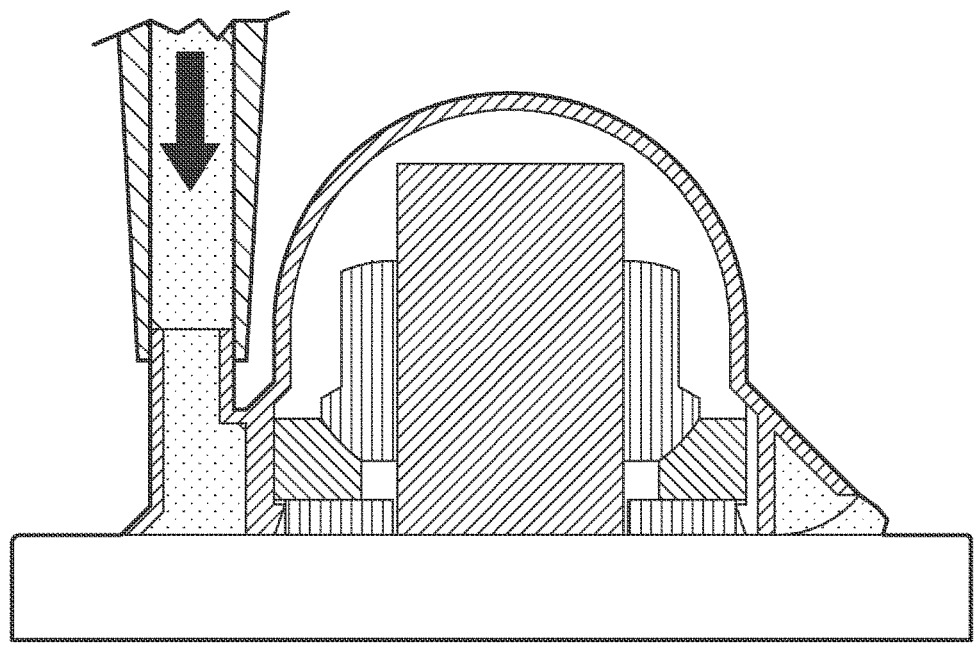
FIG. 9 shows the cap of FIG. 8 being injected with sealant on a flat panel.
Figure 10:
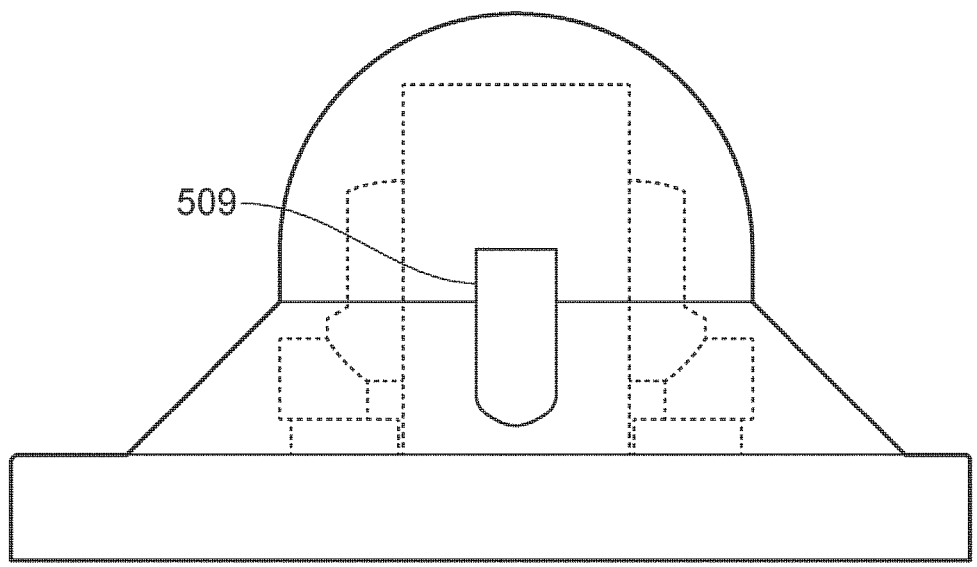
FIG. 10 is a rear view of the cap of FIG. 8.
Figure 12:
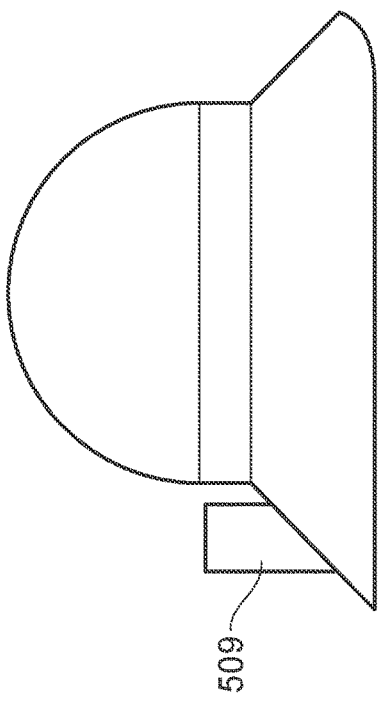
FIG. 12 is a side view of the cap of FIG. 8.

As can be seen in FIG. 14, the distance R1 of the skirt rim 502 from the axis of the cap is greater than the distance R2 to the rim of the recess 504. This enables the cap to be positioned close to a raised part 650 of the structure as shown in FIG. 8. In the example of FIG. 8 the rim of the recess 504 is shown engaging a radius portion of this raised part 650. The rim of the recess 504 may engage the radius portion at a single point or along a line, but small air gaps will remain between the skirt rim and the structure which enable air to escape the pocket through the outlet recess 504 as the sealant is injected as shown in FIG. 8. The cap is shown in FIG. 9, on the other hand, positioned on a fully planar structure. In this case, air can escape the pocket across the full extent of the recess.

Although the skirt rim no longer contacts the structure around its full closed circumference, it has been found that nevertheless the cap of FIGS. 7-14 provides a secure joint.

Figure 15:
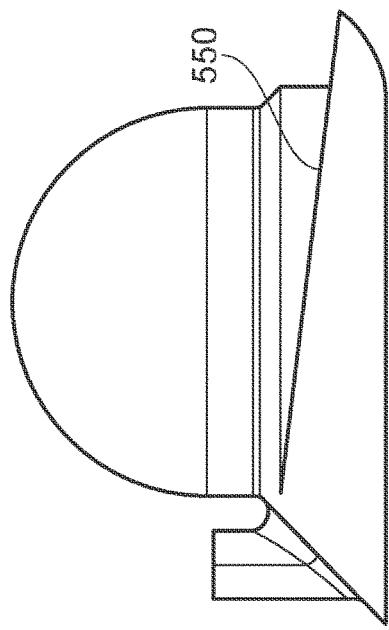
FIG. 15 is a front view of a cap with a sloping skirt.
Figure 16:
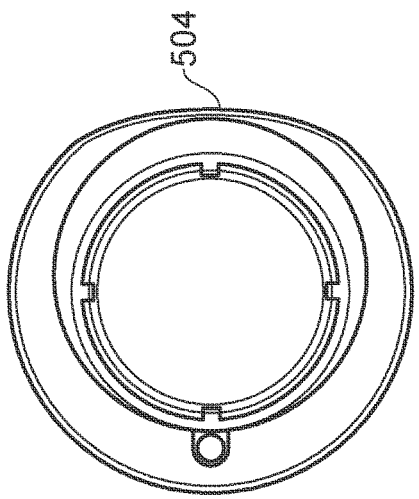
FIG. 16 is a side view of the cap of FIG. 15.

A further embodiment of the invention is shown in FIG. 15-19. The outboard (upper) end 550 of the skirt slopes down from the inlet hole to the outlet recess as most clearly visible in FIG. 16, so the depth (and hence the cross-sectional flow area) of the pocket decreases continuously from the inlet to the outlet. This has a focussing effect on the sealant which tends to guide it towards the outlet 504. Also, because the recess 504 extends over almost the entire reduced depth of the pocket (that is, the top of the recess 504 is close to the upper end 550 of the skirt as shown in FIG. 15) there is relatively little chance of an air pocket forming in this region of the pocket.

Figure 17:
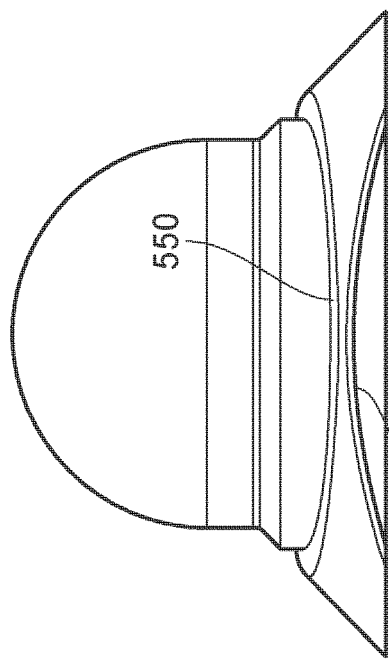
FIG. 17 is an isometric view of the cap of FIG. 15.
Figure 18:
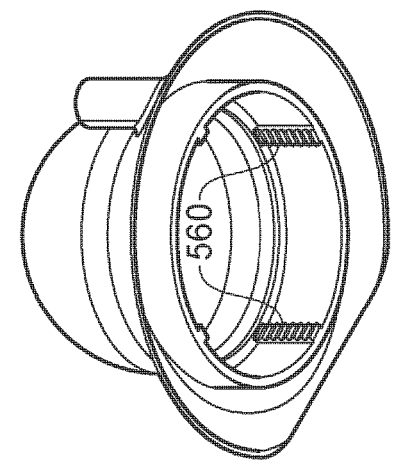
FIG. 18 is an underside view of the cap of FIG. 15.
Figure 19:
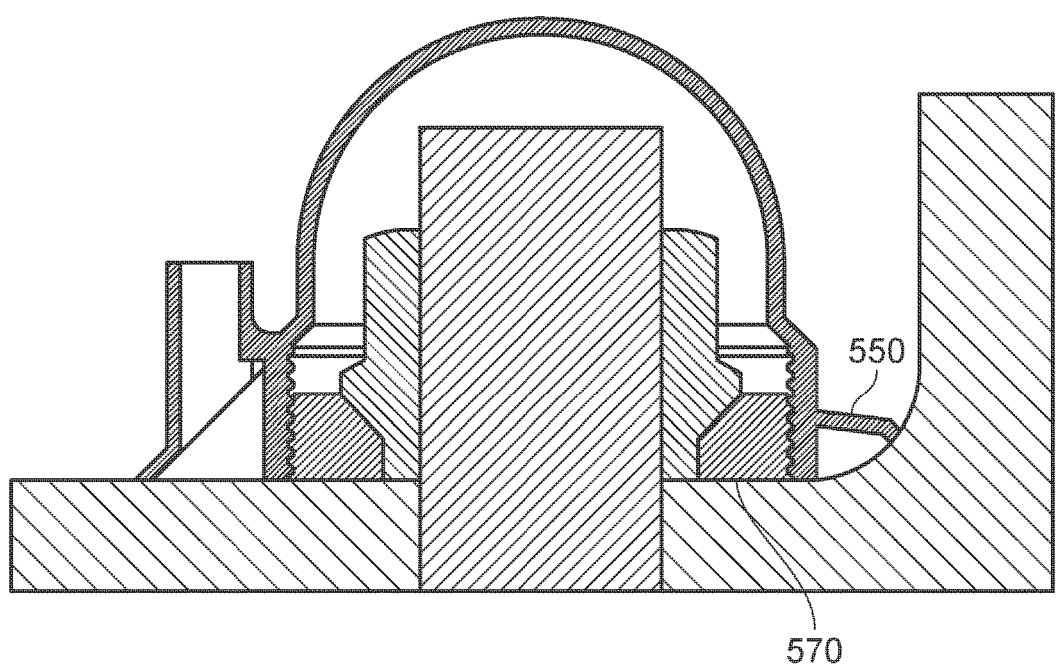
FIG. 19 is a cross-section of the cap of FIG. 15 installed on a structure.

As shown in FIGS. 17 and 19, the snap-fit ribs 500 are replaced by serrated ribs 560 which are received in corresponding serrations in the washer 570 as shown in FIG. 19.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around an end of a fastener, the cap comprising:
   a. a cap body with an annular base terminating at a rim which surrounds an opening into a central cavity;
   b. an annular skirt providing an annular pocket between the skirt and the base, the annular skirt terminating at a rim which surrounds an annular opening into the annular pocket, wherein at least part of the skirt is integrally formed with the annular base; and
   c. an inlet hole in the skirt, wherein the inlet hole is in fluid communication with the annular pocket and arranged to interconnect with a sealing material injection device to provide a flow of sealing material through the skirt via the inlet hole into the annular pocket.

2. The cap of claim 1 wherein the skirt comprises a tubular projection which projects outwardly from the skirt and leads to the inlet hole, and the tubular projection is arranged to interconnect with the sealing material injection device to provide the flow of sealing material through the skirt via the inlet hole into the pocket.

3. The cap of claim 1 wherein the rim of the annular base lies in a plane around all or a majority of its circumference, and the skirt terminates at a skirt rim which is in the same plane as the rim of the annular base.

4. The cap of claim 3 wherein the skirt has a first part which is integrally formed with the annular base from a first material and terminates at a first rim which is not in the same plane as the rim of the annular base, and a second part which is formed from a second material which is more flexible than the first material, wherein the second part terminates at the skirt rim which is in the same plane as the rim of the annular base.

5. The cap of claim 4 wherein the second part is fitted over the first part to form a nested arrangement.

6. The cap of claim 1 wherein the skirt extends from an outboard end where it meets the cap body to a skirt rim, and wherein the pocket extends from an outboard end proximate the outboard end of the skirt rim to an inboard end proximate the skirt rim.

7. The cap of claim 6 wherein the pocket has a width which increases as it extends from its outboard end to its inboard end.

8. The cap of claim 1 wherein the cap body further comprises one or more projections, wherein at least one projection extends inwardly into the central cavity.

9. The cap of claim 1, further comprising an outlet in the skirt, wherein the outlet is in fluid communication with the annular pocket and arranged to enable air to escape the annular pocket via the outlet as the sealing material flows from the inlet hole into the annular pocket.

10. The cap of claim 9 wherein the annular skirt surrounds a cap axis, and the inlet hole and outlet are positioned on opposite sides of the cap axis.

11. The cap of claim 9, wherein the skirt extends from an outboard end where it meets the cap body to a skirt rim, the pocket extends from an outboard end proximate the outboard end of the skirt rim to an inboard end proximate the skirt rim, the outboard end of the skirt lies in a first plane and the skirt rim lies in a second plane, the outlet comprises an outlet hole in the skirt, and a centre of the outlet hole is positioned closer to the first plane than the second plane.

12. The cap of claim 9 wherein the skirt has only a single outlet.

13. The cap of claim 9, wherein the outlet comprises an outlet hole in the skirt or a recess in a rim of the skirt.

14. The cap of claim 13, wherein the outlet comprises an outlet hole in the skirt.

15. The cap of claim 13, wherein the outlet comprises a recess in a rim of the skirt.

16. The cap of claim 9 wherein the annular pocket between the skirt and the base has a depth which reduces towards the outlet.

17. A cap for forming a sealed cavity around an end of a fastener, the cap comprising:
   a. a cap body with an annular base terminating at a rim which surrounds an opening into a central cavity;
   b. an annular skirt providing an annular pocket between the skirt and the base;
   c. an inlet hole in the skirt, wherein the inlet hole is in fluid communication with the pocket and arranged to interconnect with a sealing material injection device to provide a flow of sealing material through the skirt via the inlet hole into the annular pocket; and
   d. an outlet in the skirt, wherein the outlet is in fluid communication with the annular pocket and arranged to enable air to escape the annular pocket via the outlet as the sealing material flows from the inlet hole into the annular pocket.

18. The cap of claim 17 wherein at least part of the skirt is integrally formed with the annular base.

19. A joint comprising:
   a structure;
   an end of a fastener protruding from the structure; and
   a cap according to claim 17 forming a sealed cavity around the end of a fastener, the cap comprising a cured sealing material in the annular pocket which secures the cap to the structure.

20. The joint of claim 19 wherein the cured sealing material fills an outlet and optionally also protrudes out of the outlet.

21. A method of assembling the joint of claim 19, the method comprising:
   fitting the cap over the end of the fastener;
   interconnecting the inlet hole with a sealing material injection device; and
   providing a flow of sealing material from the sealing material injection device through the skirt via the inlet hole into the annular pocket, wherein air escapes the annular pocket via the outlet as the flow of sealing material is provided through the skirt.

22. The method of claim 21 wherein the cap comprises an outlet in the skirt, the method further comprising:
   detecting sealing material escaping the pocket through the skirt via the outlet, and
   stopping the flow of sealing material from the sealing material injection device in response to said detection.

* * * * *